(12) United States Patent
Naito et al.

(10) Patent No.: US 7,811,338 B2
(45) Date of Patent: Oct. 12, 2010

(54) SOLID ELECTROLYTIC CAPACITOR ELEMENT, METHOD FOR MANUFACTURING SAME, AND SOLID ELECTROLYTIC CAPACITOR

(75) Inventors: Kazumi Naito, Chiba (JP); Shoji Yabe, Chiba (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 473 days.

(21) Appl. No.: 11/910,036

(22) PCT Filed: Mar. 29, 2006

(86) PCT No.: PCT/JP2006/306405

§ 371 (c)(1),
(2), (4) Date: Sep. 28, 2007

(87) PCT Pub. No.: WO2006/106703

PCT Pub. Date: Oct. 12, 2006

(65) Prior Publication Data

US 2008/0250621 A1    Oct. 16, 2008

(30) Foreign Application Priority Data

Mar. 30, 2005   (JP) .............................. 2005-097644

(51) Int. Cl.
*H01G 9/00*   (2006.01)
(52) U.S. Cl. ..................... 29/25.03; 361/523
(58) Field of Classification Search ............... 29/25.03; 361/523
See application file for complete search history.

(56) References Cited

U.S. PATENT DOCUMENTS

| | | | |
|---|---|---|---|
| 3,864,219 A | 2/1975 | Dosch et al. | |
| 4,803,596 A | 2/1989 | Hellwig et al. | |
| 6,229,689 B1 | 5/2001 | Kobayashi et al. | |
| 6,602,741 B1 | 8/2003 | Kudoh et al. | |
| 6,671,167 B2 | 12/2003 | Araki et al. | |
| 6,795,299 B2 * | 9/2004 | Naito | 361/509 |
| 6,909,594 B2 * | 6/2005 | Omori et al. | 361/509 |
| 2003/0111247 A1 | 6/2003 | Araki et al. | |
| 2003/0147202 A1 | 8/2003 | Kudoh et al. | |
| 2004/0184221 A1 | 9/2004 | Kudoh et al. | |
| 2008/0019080 A1 * | 1/2008 | Naito et al. | 361/523 |

FOREIGN PATENT DOCUMENTS

| | | |
|---|---|---|
| JP | 50-100570 | 8/1975 |
| JP | 50-102861 | 8/1975 |
| JP | 64-32621 | 2/1989 |
| JP | 10-32145 | 2/1998 |
| JP | 2002-8946 | 1/2002 |
| JP | 2004-336018 | 11/2004 |
| KR | 1988-0013199 | 11/1988 |
| KR | 1998-0011547 | 4/1998 |
| KR | 2003-0043654 | 6/2003 |
| KR | 10-2006-0005370 | 1/2006 |

* cited by examiner

*Primary Examiner*—Charles D Garber
*Assistant Examiner*—Stanetta D Isaac
(74) *Attorney, Agent, or Firm*—Sughrue Mion, PLLC

(57) ABSTRACT

The invention produces a solid electrolytic capacitor using a solid electrolytic capacitor element by a method comprising forming a dielectric layer on the surface of an electric conductor, forming a semiconductor layer containing electrically conducting polymer on the dielectric layer and forming an electrode layer thereon, wherein the dielectric layer is formed by chemical formation in an electrolytic solution containing a dopant.

16 Claims, No Drawings

SOLID ELECTROLYTIC CAPACITOR ELEMENT, METHOD FOR MANUFACTURING SAME, AND SOLID ELECTROLYTIC CAPACITOR

TECHNICAL FIELD

The present invention relates to a production method of a solid electrolytic capacitor element with good reliability.

BACKGROUND ART

As for a capacitor having high capacitance and low ESR (equivalent series resistance) used in various electronic devices, an aluminum solid electrolytic capacitor and a tantalum solid electrolytic capacitor are known.

The solid electrolytic capacitor is produced by sealing a solid electrolytic capacitor element in which an aluminum foil having fine pores in the surface layer or a tantalum powder sintered body having fine pores in the inside is used as one electrode (electric conductor) and which comprises a dielectric layer formed on the surface layer of the electrode, the other electrode (usually a semiconductor layer) provided on the dielectric layer, and an electrode layer stacked on the other electrode. In comparison among capacitors using electric conductors having the same volume, the smaller the size of the fine pores of the conductor and the larger the number of the pores, the larger the surface area of the conductor inside and the larger the capacitance of the capacitor produced from the electric conductor can be.

The dielectric layer is formed by an electrochemical method called chemical formation. An example of the forming process is a method where an electrically conducting layer is dipped in an electrolytic solution containing a mineral acid (e.g., phosphoric acid, sulfuric acid) or a salt thereof, or an organic acid (e.g., acetic acid, adipic acid, benzoic acid) or a salt thereof dissolved therein and a predetermined voltage is applied between the electric conductor serving as an anode and a cathode separately provided in the electrolytic solution. A part of the electrolyte used for the chemical formation is incorporated into the dielectric layer.

JP-A-S50-100570 (the term "JP-A" as used herein means an "unexamined published Japanese patent application"; patent Document 1, related application; U.S. Pat. No. 3,864,219) describes chemical formation in an electrolytic solution using quaternary ammonium salt. Also, JP-A-S50-102861 (patent Document 2) describes chemical formation in an electrolytic solution using boric acid or the like.

As for the semiconductor layer, an organic or inorganic compound is used but in the light of heat resistance or low ESR property of the produced capacitor, an electrically conducting polymer is used in preference. The electrically conducting polymer is a polymer having a high electric conductivity of $10^{-2}$ to $10^3$ S·cm$^{-1}$. The high electric conductivity is prepared by adding an electron-donating compound called a dopant to a polymer having a planer conjugated double bond (generally, insulating material or a polymer having a very low electric conductivity). Specific examples of the method for forming an electrically conducting polymer as the semiconductor layer include a method of polymerizing a monomer capable of being polymerized to an electrically conducting polymer in the fine pores of the electric conductor by supplying thereto an appropriate oxidizing agent or an electron in the presence of a dopant. The dopant is entrained upon polymerization of the monomer and strong interaction with the polymer having a conjugated double bond occurs, whereby an electrically conducting polymer is obtained.

A solid electrolytic capacitor is required to have a high reliability. One example of examining the reliability by acceleration is a high heat load test. In the test, for example, solid electrolytic capacitors are left standing at 105° C. for thousands of hours while applying a rated voltage of the capacitor and those not whose electric properties have not degraded are determined as acceptable.
[Patent Document 1]
Japanese Patent Application Laid-Open No. S50-100570
[Patent Document 2]
Japanese Patent Application Laid-Open No. S50-102861

DISCLOSURE OF THE INVENTION

Problems to be Solved by the Invention

Recent electronic devices are desired to be small in size and have large capacitance. Solid electrolytic capacitors having large surface area to meet such demands involve a problem that their electric properties, especially dielectric tangent performance, are easy to deteriorate under the high heat load test.

Accordingly, an object of the present invention is to provide a high-capacitance solid electrolytic capacitor with high reliability.

Means For Solving The Problem

As a result of intensive investigations to solve the above-described problem, the present inventors have found that when a dielectric layer of a solid electrolytic capacitor using a semiconductor layer comprising at least an electrically conducting polymer is formed by chemical formation in an electrolytic solution containing a dopant, a solid electrolytic capacitor exhibiting high reliability can be obtained. The present invention has been accomplished based on this finding.

That is, the present invention provides a production method of a solid electrolytic capacitor element, a solid electrolytic capacitor produced by using the method, and uses thereof, as follows.

1. A method for producing a solid electrolytic capacitor element, comprising forming a dielectric layer on the surface of an electric conductor, forming a semiconductor layer containing electrically conducting polymer on the dielectric layer and forming an electrode layer thereon, wherein the dielectric layer is formed by chemical formation in an electrolytic solution containing a dopant.
2. The method for producing a solid electrolytic capacitor element as described in 1 above, wherein the dopant is the same as the dopant contained in the electrically conducting polymer constituting the semiconductor layer.
3. The method for producing a solid electrolytic capacitor element as described in 1 above, wherein the dopant is an electron-donating compound which gives an electrically conducting polymer having an electric conductivity of $10^1$ to $10^3$ S·cm$^{-1}$ when doped at the time of electrolytic polymerization.
4. The method for producing a solid electrolytic capacitor element as described in any one of 1 to 3 above, wherein the dopant is at least one member selected from compounds having a sulfonic acid group.
5. The method for producing a solid electrolytic capacitor element as described in 4 above, wherein the dopant is at least one member selected from quinone sulfonic acids which may be substituted.
6. The method for producing a solid electrolytic capacitor element as described in any one of 1 to 3 above, wherein the dopant is at least one member selected from boron compounds in which a carboxylic acid is coordinated to a boron atom.

7. The method for producing a solid electrolytic capacitor element as described in 1 or 2 above, wherein chemical formation is further performed again in the electrolytic solution described above.

8. The method for producing a solid electrolytic capacitor element as described in 1 above, wherein the electric conductor is a metal or alloy mainly comprising at least one member selected from a group consisting of tantalum, niobium, titanium and aluminum; a niobium oxide; or a mixture of at least two of the members selected from these metals, alloy and niobium oxide.

9. The method for producing a solid electrolytic capacitor element as described in 1 above, wherein the semiconductor layer is at least one layer selected from semiconductors mainly comprising an electrically conducting polymer obtained by doping a dopant in a polymer containing a repeating unit represented by the following formula (1) or (2):

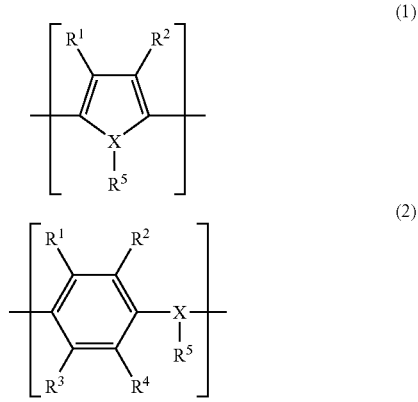

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

10. The method for producing a solid electrolytic capacitor element as described in 9 above, wherein the polymer containing a repeating unit represented by formula (I) is a polymer containing, as a repeating unit, a structural unit represented by the following formula (3):

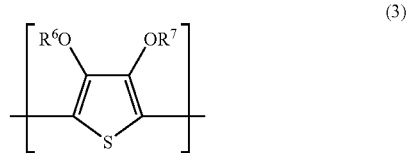

wherein $R^6$ and $R^7$ each independently represents a hydrogen atom, a linear or branched, saturated or unsaturated alkyl group having from 1 to 6 carbon atoms, or a substituent forming at least one or more 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

11. The method for producing a solid electrolytic capacitor element as described in 9 above, wherein the electrically conducting polymer is selected from a group consisting of polyaniline, polyoxyphenylene, polyphenylene sulfide, polythiophene, polyfuran, polypyrrole, polymethylpyrrole, and a substitution derivative and a copolymer thereof.

12. The method for producing a solid electrolytic capacitor element as described in 10 or 11 above, wherein the electrically conducting polymer is poly(3,4-ethylene-dioxythiophene).

13. The method for producing a solid electrolytic capacitor element as described in 9 above, wherein the electric conductivity of the semiconductor is from $10^{-2}$ to $10^3$ S·cm$^{-1}$.

14. A solid electrolytic capacitor element obtained by the production method described in any one of 1 to 13 above.

15. A solid electrolytic capacitor obtained by sealing the solid electrolytic capacitor element described in 14 above.

16. An electronic circuit using the solid electrolytic capacitor described in 15 above.

17. An electronic device using the solid electrolytic capacitor described in 15 above.

Effects Of The Invention

The present invention provides a method for producing a solid electrolytic capacitor element, wherein a dielectric layer is formed by chemical formation in an electrolytic solution containing a dopant, and also provides a solid electrolytic capacitor obtained by sealing a capacitor element produced by the production method. According to the present invention, a high-capacitance solid electrolytic capacitor with high reliability can be produced.

BEST MODE FOR CARRYING OUT THE INVENTION

The production method of a solid electrolytic capacitor element according to the present invention and one embodiment of the solid electrolytic capacitor produced by the method are described below.

Examples of the electric conductor for use in the present invention include a metal or alloy mainly comprising at least one member selected from tantalum, niobium, titanium and aluminum; a niobium oxide; and a mixture of at least two members selected from these metals, alloy and niobium oxide.

In the case of using a metal as the electric conductor, the metal may be used after subjecting a part thereof to at least one treatment selected from carbonization, phosphation, boronation, nitridation and sulfidation.

The electric conductor is not particularly limited in its shape and is used, for example, in the form of foil, plate or bar or in a form created by molding or sintering after molding the powder of the electric conductor. The electric conductor may also be foil-like or plate-like metal prepared by attaching powdery electric conductor thereto and sintering it. Furthermore, the electric conductor may be surface-treated by etching or the like to produce fine pores. In a case where the electric conductor is pulverized and molded or is pulverized and then sintered after molded, fine pores can be produced in the inside after molding or sintering by appropriately selecting the pressure at the time of molding.

An outgoing lead may be connected directly to the electric conductor. In a case where the electric conductor is pulverized and molded or is pulverized and then sintered after molded, it is also possible to mold a part of a separately prepared lead wire (or a lead foil) together with the powder and use the part of the outgoing lead wire (or lead foil) outside the molded portion as an outgoing lead for one electrode of the solid electrolytic capacitor element. Or, a part of the electric conductor, which part is left without semiconductor layer formed, may be used as an anode. At the boundary between the anode part and the semiconductor layer-forming part, an insulating resin may be attached and cured like a belt so as to prevent the semiconductor layer from crawling up.

Preferred examples of the electric conductor for use in the present invention include an aluminum foil with the surface being etched, and a sintered body having many fine pores in the inside, which is obtained by molding and then sintering a powder such as tantalum powder, niobium powder, alloy powder mainly comprising tantalum, alloy powder mainly comprising niobium, and niobium monoxide powder.

In a case where a sintered body is to be prepared by molding a powder and then sintering the compact, the produced sintered body can have a large specific surface area per mass by using a powder having a small particle diameter. In the present invention, it is preferred that the CV value (value obtained by dividing a product of capacitance and chemical formation voltage described later by mass) be 80,000 µFV/g or more in the case of tantalum powder or 150,000 µFV/g or more in the case of niobium powder or niobium monoxide powder and that the mass be 20 mg or more, preferably 50 mg or more, because the produced solid electrolytic capacitor element can have a large capacitance with a small volume.

Examples of the dielectric layer formed on the surface of the electric conductor of the present invention include a dielectric layer mainly comprising at least one member selected from metal oxides such as $Ta_2O_5$, $Al_2O_3$, $TiO_2$ and $Nb_2O_5$. It is important that such a dielectric layers is formed by chemical formation in an electrolytic solution containing a dopant in the present invention.

The dopant is a compound which can cause an effect to convert a polymer compound an electric conductor when doped chemically or electrochemically to the polymer compound having a conjugated double bond at its main chain. For example, the dopant is an electron-donating compound which gives an electrically conducting polymer having an electric conductivity of $10^1$ to $10^3$ $S \cdot cm^{-1}$ when pyrrole or 3,4-ethylenedioxythiophene is used as a representative monomer and the dopant is doped simultaneously with electrolytic polymerization of the monomer.

Preferred specific examples of the dopant include a compound having a sulfonic acid group, and a boron compound in which a carboxylic acid is coordinated to the boron atom. Representative examples of such a compound include sulfonic acids having an aromatic ring or an alkyl substituted aromatic ring, such as benzenesulfonic acid, toluenesulfonic acid, naphthalenesulfonic acid and anthracenesulfonic acid; quinonesulfonic acids such as benzoquinonesulfonic acid, naphthoquinonesulfonic acid and anthraquinonesulfonic acid; sulfonic acids having an alkyl group, such as butylsulfonic acid, hexylsulfonic acid and cyclohexylsulfonic acids; various oligomer or polymer (polymerization degree: from 2 to 200) sulfonic acids such as polyvinylsulfonic acid; and salts (e.g., ammonium salt, alkali metal salt, alkaline earth metal salt and other metal salt) of these sulfonic acids. These compounds may have various substituents and may have a plurality of sulfonic acid groups. Examples thereof include 2,6-naphthalenedisulfonic acid and 1,2-ethane disulfonic acid. Examples of the boron compound include ammonium borodisalicylate, a hydrate thereof and boro-1,2-carboxybenzene ammonium. As for the dopant, two or more dopants may be used in combination. Among these dopants, preferred are nonsurfactant-type dopants such as a quinonesulfonic acid and a salt thereof, because the solid electrolytic capacitor produced by forming a dielectric layer using the dopant has good reliability. In unsubstituted quinonesulfonic acids cited in the above, quinonesulfonic acids substituted with a lower alkyl group are also included in the present invention.

Furthermore, it is preferable to use the same dopant as the dopant contained in the electrically conducting polymer constituting the semiconductor layer, that is, the dopant used for doping at the same time as the polymerization by an electrolytic polymerization, because the produced solid electrolytic capacitor exhibits a lower ESR value.

The dopant for use in the present invention is described as a compound. When the compound is used as dopant, the compound is in a state that a part of the compound is charged ($\delta$-) or ionized (mostly anion) and those compounds in such a state are also included in the scope of constituent elements of the present invention (for example, in the case of a benzenesulfonic acid, benzenesulfonate anion is also included).

The concentration of the dopant used therein is determined by taking account of reliability of a produced solid electrolytic capacitor, but usually a few tens of percent or less.

The electrolytic solution containing a dopant of the present invention is a solution where at least one kind of the dopant described above is dissolved or a part of the dopant is suspended in organic solvent such as water and/or various alcohols, various esters and various grimes. In a case where the electrolytic solution is an aqueous solution, the electrolytic solution can be an aqueous solution for chemical formation. As for the electrolyte in the chemical formation, at least one kind of conventionally known electrolytes such as a mineral acid (e.g., phosphoric acid, sulfuric acid, boric acid) or a salt thereof, or an organic acid (e.g., acetic acid, adipic acid, benzoic acid, nitrobenzoic acid) or a salt thereof may be dissolved or may be suspended in part.

Furthermore, the electric conductor of the present invention may be subjected to chemical formation in an electrolytic solution containing a known electrolyte before and after formation of the dielectric layer in an electrolytic solution containing a dopant of the present invention. After each chemical formation, cleaning and drying process may be provided so as to remove the electrolytic solution used for the chemical formation.

This dielectric layer can be formed by dipping the electric conductor in an electrolytic solution, and applying a voltage between the electric conductor serving as the anode and a cathode plate separately disposed in the electrolytic solution (this treatment is called "chemical formation"). The conditions of chemical formation, such as chemical formation temperature, chemical formation time and current density at chemical formation, are determined by taking account of the type, mass and size of the electric conductor, the capacitance and operating voltage of the objective solid electrolytic capacitor element or the like. The chemical formation temperature is usually from room temperature to 100° C., and the chemical formation time is usually from several hours to several days.

It is assumed that, when the dielectric layer is formed by chemical formation in an electrolytic solution containing a dopant in the present invention, a trace amount of dopant is incorporated into the dielectric layer. It can be presumed that dopant with one part being incorporated in the inside of the dielectric layer and the other part being outside the surface of the dielectric layer interacts with the electrically conducting polymer constituting the semiconductor layer described later to thereby play a role in linking firmly the dielectric layer with the electrically conducting polymer, and thus the dopant prevents dielectric tangent from deteriorating due to separation of the electrically conducting polymer from the dielectric layer during the high heat load test.

Meanwhile, the other electrode formed on the dielectric layer of the present invention includes at least one organic semiconductor selected from electrically conducting polymers described later. The organic semiconductor contains an electrically conducting polymer an essential component, and may further contain at least one compound selected from other organic semiconductors and inorganic semiconductors as a layer or as a mixture.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant in a polymer containing a repeating unit represented by the following formula (1) or (2):

[Chem. 3]

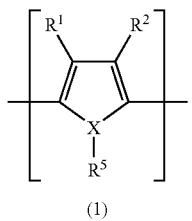 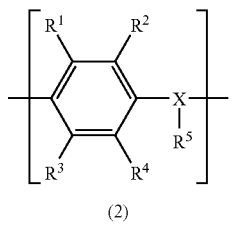

(1) (2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

In the present invention, the polymer containing a repeating unit represented by formula (1) is preferably a polymer containing, as a repeating unit, a structural unit represented by the following formula (3):

[Chem. 4]

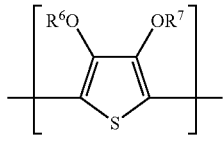

(3)

wherein $R^6$ and $R^7$ each independently represents a hydrogen atom, a linear or branched, saturated or unsaturated alkyl group having from 1 to 6 carbon atoms, or a substituent forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is being electrically charged and a dopant is doped therein. The dopant is not particularly limited and a known dopant can be used.

Preferred examples of the dopant include compounds mentioned as dopant examples which may be used in forming a dielectric layer by chemical formation in an electrolytic solution containing the dopant. It is true of the dopant here that two or more dopants may be used in combination.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and a substitution derivative and a copolymer thereof. Among these, preferred are polypyrrole, polythiophene and a substitution derivative thereof (e.g., poly(3,4-ethylenedioxythiophene)).

The above-described semiconductor layer is formed by a pure chemical reaction (for example, a solution reaction, a vapor phase reaction, a solid-liquid reaction or a combination thereof), an electrolytic polymerization technique, or a combination of these methods. It is preferred that the semiconductor layer be produced by employing an electrolytic polymerization technique at least once, in that the initial ESR value can be low as compared with other methods, presumably that is because no branching is generated in the electrically conducting polymer chain or because thickness of the semiconductor layer on the outer surface layer of the electric conductor can be uniform by this technique.

Specific examples of the inorganic semiconductor include at least one compound selected from molybdenum dioxide, tungsten dioxide, lead dioxide and manganese dioxide.

When the organic or inorganic semiconductor used has an electric conductivity of $10^{-2}$ to $10^3$ S·cm$^{-1}$, the solid electrolytic capacitor produced can have a small ESR value and this is preferred.

In order to repair fine defects of the dielectric layer, generated during the formation of the semiconductor layer, re-chemical formation may be performed. Moreover, the operation of forming a semiconductor layer and then re-chemical formation can be repeated multiple times, and the conditions of each operation while repeating the operation may be flexible. Usually, when the operation of a semiconductor layer formation is stopped, the electric conductor is pulled up from a solution for a semiconductor layer formation then washed and dried. The re-chemical formation operation may be performed after repeating operations of formation of semiconductor layer/stopping of the semiconductor layer formation/washing/drying twice or more. Although the reason why is not known exactly, mass of the semiconductor layer is increased in some cases where operations of formation of semiconductor layer/stopping of the semiconductor layer formation/washing/drying are repeated as compared with cases where the operation of forming a semiconductor layer is continuously performed, if the total time for forming a semiconductor layer is the same.

The re-chemical formation may be performed in the same manner as the above-described method of forming a dielectric layer by chemical formation, or may be performed in a known electrolytic solution. However, it is preferred to perform the re-chemical formation in the same electrolytic solution as used in forming a dielectric layer of the present invention, in that the ESR value of the produced solid electrolytic capacitor can become low. The re-chemical formation voltage is usually lower than the chemical formation voltage.

Furthermore, as a pretreatment before semiconductor layer formation, minute protruding portions may be formed as small electrically defect portions on the dielectric layer formed on the surface of an electric conductor for the purpose of enhancing formation of a semiconductor layer to be formed thereon.

In a case where formation of a semiconductor layer is divided into two or more steps, the re-chemical formation may be performed at an arbitrary stage an arbitrary number of times. It is preferable that re-chemical formation be performed after the final formation step of the semiconductor layer.

In the present invention, an electrode layer is provided on the semiconductor layer. The electrode layer can be formed, for example, by solidification of an electrically conducting paste, plating, metal deposition or lamination of a heat-resistant electrically conducting resin film. Preferred examples of the electrically conducting paste include silver paste, copper paste, aluminum paste, carbon paste and nickel paste. One of these may be used or two or more thereof may be used. In the case of using two or more pastes, these pastes may be mixed or stacked as separate layers. The electrically conducting paste applied is then left standing in air or heated and thereby solidified.

Resin and electrically conducting powder such as metal are the main component of the electrically conducting paste. If desirable, a solvent for dissolving the resin or a curing agent for the resin is also used. The solvent dissipates at the time of the above-described solidification under heating. As for the resin, various known resins such as alkyd resin, acryl resin, epoxy resin, phenol resin, imide resin, fluororesin, ester resin, imideamide resin, amide resin and styrene resin are used. As for the electrically conducting powder, a powder of silver, copper, aluminum, gold, carbon, nickel or an alloy mainly comprising such a metal, or a mixed powder thereof is used. The electrically conducting powder is usually contained in an amount of 40 to 97 mass %. If the electrically conducting powder content is less than 40 mass %, the electric conductivity of the produced electrically conducting paste disadvantageously becomes low, whereas if the content exceeds 97 mass %, the electrically conducting paste may undergo adhesion failure and this is not preferred. In the electrically conducting paste, the above-described electrically conducting polymer for forming the semiconductor layer or powder of metal oxide may be mixed and used.

Examples of the plating include nickel plating, copper plating, silver plating, gold plating and aluminum plating. Examples of the metal to be deposited include aluminum, nickel, copper, gold and silver.

More specifically, the electrode layer is formed by sequentially stacking, for example, a carbon paste and a silver paste on the semiconductor layer formed. By stacking layers up to the electrode layer on the electric conductor in this way, a solid electrolytic capacitor element is produced.

The solid electrolytic capacitor element of the present invention having such a constitution is jacketed, for example, by resin mold, resin case, metallic jacket case, resin dipping or laminate film, whereby a solid electrolytic capacitor product for various uses can be completed. Among these, a chip solid electrolytic capacitor jacketed by resin mold is most preferred, in that reduction in the size and cost can be easily achieved.

The resin mold jacketing is specifically described below. A part of the electrode layer of the capacitor element obtained as above is laid on one end part of a separately prepared lead frame having a pair of oppositely disposed end parts, and a part of the electric conductor is laid on the other end part of the lead frame. At this time, in a case where the electric conductor has an anode lead, in order to adjust the dimensions, the anode lead may be used after cutting off some end part thereof. After connecting the above parts electrically or mechanically, i.e., the former (one end part of the lead frame) is connected by solidification of an electrically conducting paste and the latter (the other end part of the lead frame) by welding, the entirety is sealed with a resin while leaving a part of end of the lead frame outside the sealing, and the lead frame is cut at predetermined portions outside the resin sealing and bent (when the lead frame is present on the bottom surface of resin sealing and the entirety is sealed while leaving outside only the bottom surface or the bottom and side surfaces of the lead frame, only cutting process without bending may be sufficient), whereby the capacitor of the present invention is produced.

The lead frame is cut as described above and finally works out to an external terminal of the capacitor. The shape thereof is a foil or flat plate form and the material used therefor is iron, copper, aluminum or an alloy mainly comprising such a metal. The lead frame may be partially or entirely covered with at least one plating layer such as solder, tin, titanium, gold, silver, nickel, palladium and copper.

After or before the above-described cutting and bending, the lead frame may be subjected to various platings. It is also possible to plate the lead frame before mounting and connecting the solid electrolytic capacitor element thereon and again plate it at any time after sealing.

In the lead frame, a pair of oppositely disposed end parts is present and a gap is provided between these end parts, whereby the electric conductor part and the electrode layer part of each capacitor element are insulated from each other.

With respect to the resin used for resin mold jacketing, a known resin used for encapsulation of a capacitor, such as epoxy resin, phenol resin, alkyd resin, ester resin and allyl ester resin, can be employed. In all of these resins, when a low-stress resin (for example, a resin containing usually 70 vol % or more of a filler and having a thermal expansion coefficient $\alpha$ of $3 \times 10^{-5}/°$ C. or less) generally available on the market is used, the encapsulation stress imposed on the capacitor element, which is generated at the encapsulation, can be mitigated and this is preferred. For the resin sealing, a transfer machine is used with preference.

The thus-produced solid electrolytic capacitor may be subjected to an aging treatment so as to repair the thermal and/or physical deterioration of the dielectric layer, which is caused at the formation of electrode layer or at the jacketing.

The aging treatment is performed by applying a predetermined voltage (usually, within twice the rated voltage) to the capacitor. The optimal values of aging time and temperature vary depending on the type and capacitance of the capacitor and the rated voltage and therefore, these are previously determined by performing an experiment. The aging time is usually from several minutes to several days and the aging temperature is usually 300° C. or less by taking account of thermal deterioration of the voltage-applying jig.

The aging may be performed in any one condition of reduced pressure, atmospheric pressure and applied pressure. Also, the aging atmosphere may be air or a gas such as argon, nitrogen and helium, but preferred is water vapor. When the aging is performed in water vapor and then performed this in air or a gas such as argon, nitrogen and helium, stabilization of the dielectric layer sometimes proceeds. The aging may also be performed by supplying water vapor and then returning the aging conditions to room temperature and atmospheric pressure, or may be performed by supplying water vapor and then allowing the capacitor to stand at a high temperature of 150 to 250° C. for several minutes to several hours to remove excess water content. One example of the method for supplying the water vapor is a method of supplying water vapor from a water reservoir placed in the aging furnace by heat, or a method of performing the aging in a constant temperature and humidity bath.

The method of applying a voltage can be designed to pass an arbitrary current such as direct current, alternating current having an arbitrary waveform, alternating current superposed on direct current, and pulse current. It is also possible to once stop applying a voltage on the way of aging and again apply a voltage. The aging may be performed while raising a voltage from low voltage to high voltage in sequence.

The solid electrolytic capacitor produced by the method of the present invention can be preferably used, for example, for a circuit using a high-capacitance capacitor, such as central processing circuit and power source circuit. These circuits can be used in various digital devices such as a personal computer, server, camera, game machine, DVD equipment, AV equipment and cellular phone, and electronic devices such as various power sources. The solid electrolytic capacitor produced in the present invention has a high capacitance and reliability and therefore, electronic circuits or electronic devices obtained produced by using the capacitor can give great satisfaction to users.

EXAMPLES

The present invention is described in greater detail below by specifically referring to Examples, but the present invention is not limited to these Examples.

Examples 1 to 6

A niobium primary powder (average particle diameter: 0.32 μm) ground by utilizing hydrogen embrittlement of a niobium ingot was granulated to obtain a niobium powder having an average particle diameter of 120 μm (this niobium powder was fine powder and therefore, naturally oxidized to contain 85,000 ppm of oxygen). The obtained niobium powder was left standing in a nitrogen atmosphere at 400° C. and further in argon at 700° C. to obtain a partially nitrided niobium powder (CV: 286,000 μF·V/g) having a nitrided amount of 7,500 ppm. The resulting niobium powder was molded together with a niobium wire of 0.48 mm in diameter and the molded article was sintered at 1,270° C. to prepare a plurality of sintered bodies (electrically conducting bodies) having a size of 4.5×3.5×1.0 mm (mass of each sintered body: 0.07 g; the niobium lead wire was present such that 4.0 mm was inside the sintered body and 10 mm was outside).

Thereafter, the sintered body was chemically formed in an electrolytic solution containing a dopant described in examples 1 to 6 of Table 1 at 80° C. with 20 V for 8 hours to form a dielectric layer mainly comprising diniobium pentoxide on the sintered body surface and on a part of the lead wire. After washing the sintered body with water and dipping the sintered body in an alcohol solution, the sintered body was dried to remove the alcohol. Subsequently, an operation of dipping the sintered body in an 5% iron naphthalene-2-sulfonate alcohol solution, drying it and then performing re-chemical formation in an aqueous solution for chemical formation of each Example at 80° C. with 15 V for 5 minutes and drying it was repeated 5 times.

Furthermore, the sintered body was dipped in a bath (the bath was laminated with a tantalum foil to serve as an external electrode) containing a separately prepared mixed solution of 30 mass % ethylene glycol and water, in which a trace amount of pyrrole monomer and 4% anthraquinone-2-sulfonic acid were dissolved. By using the lead wire of the sintered body as anode and an external electrode as the cathode to, electrolytic polymerization was performed at 100 μA for 60 minutes. The sintered body was pulled up from the bath, washed with water, washed with an alcohol, dried and then subjected to re-chemical formation in an electrolytic solution of each Example at 80° C. with 13 V for 15 minutes.

This operation of performing electrolytic polymerization and then re-chemical formation was repeated 6 times, whereby a semiconductor layer comprising polypyrrole was formed on the dielectric layer.

On this semiconductor layer, a carbon paste layer mainly comprising water and graphite carbon was stacked and dried to be a carbon layer, and then a silver paste mainly comprising 90 mass % of silver powder and 10 mass % of acrylic resin was stacked and dried to form an electrode layer. In this way, 30 solid electrolytic capacitor elements were produced. The conductors were placed such that the lead wire and the silver paste surface of the electrode layer were in contact with end parts of a separately prepared lead frame (copper alloy with both surfaces being coated with 0.7-μm nickel base plating and 10-μm matte tin plating further formed thereon) serving as an external terminal, and each was electrically or mechanically connected by spot-welding for the former and by a silver paste mainly comprising epoxy resin and silver powder for the latter. Thereafter, the entirety excluding a part of the lead flame was transfer-molded with epoxy resin and the lead frame outside the mold was cut at a predetermined position and the remaining frame was bent along the jacket to serve as an external terminal. In this way, chip solid electrolytic capacitors each in a size of 7.3×4.3×1.8 mm were prepared. Subsequently, the capacitors were aged at 125° C. with 7 V for 3 hours and then passed through a tunnel furnace in which the peak temperature were 270° C. and the dwelling time in the region of 230° C. was 35 seconds. Subsequently, postplating were performed on the capacitors in an electrolytic solution containing tin ion so that the external terminals may recover from discoloration and further, the capacitors were aged at 135° C. with 7 V for 3 hours to thereby produce final chip solid electrolytic capacitors.

Comparative Example 1

Chip solid electrolytic capacitors were produced in the same manner as in Example 1 except that the chemical formation was performed by using dopant-free aqueous 1 mass % phosphoric acid solution instead of the electrolytic solution used in Example 1 and that re-chemical formation was performed in dopant-free aqueous 0.1% acetic acid solution.

Examples 7 to 12

Tantalum sintered bodies (each having a size of 4.5×1.0×3.0 mm and a mass of 83 mg, with a 0.40-mmΦ tantalum outgoing lead wire 4.1 mm of which was present inside the sintered body and 15 mm of which was present outside the body) each having CV value (the value obtained by dividing a product of capacitance and electrochemical voltage by mass value) of 150,000 μF·V/g were used as electric conductors. In order to protect the lead wires from splashing up of solution at the later step for forming a semiconductor layer, a tetrafluoroethylene-made washer was attached to each of the lead wires.

Each of the sintered bodies to serve as anode, excluding a part of the lead wire, was immersed in an electrolytic solution containing each dopant for Examples 7 to 12 as shown in Table 1. A current of 10 V was applied between the anode and a tantalum plate electrode serving as cathode to cause chemical formation at 30° C. for 7 hours to thereby form a dielectric oxide film layer comprising $Ta_2O_5$.

The two operations of immersing each of these sintered bodies, excluding the lead wire, in an aqueous 8% iron toluenesulfonate solution, followed by drying at 100° C. and subsequently, performing re-chemical formation at 30° C. with 9 V for 5 minutes in each aqueous solution for chemical formation for each of Examples 7 to 12, followed by drying, were repeated 5 times alternately.

Subsequently, the sintered body was immersed in a bath (which had tantalum foil attached on its polypropylene-made bottom part to serve as an external electrode) containing a mixed solution of 30 mass % ethylene glycol and water, in which 3,4-ethylenedioxythiophene monomer and 4% anthraquinone-2-sulfonic acid were dissolved each in an amount large enough for insoluble portions to be present therein. By using the lead wire of the sintered body as anode and the external electrode as cathode, electrolytic polymerization was performed at 120 μA for 60 minutes. The sintered bodies were pulled out from the bath, washed with water and with alcohol, dried and then subjected to re-chemical formation in an electrolytic solution for each Example at 30° C. with 7 V for 15 minutes. This operation of performing electrolytic polymerization and then re-chemical formation was repeated 8 times, whereby a semiconductor layer comprising a polythiophene derivative was formed on the dielectric layer.

On this semiconductor layer, an electrode layer was formed in the same manner as in Example 1 and the sintered bodies were sealed with epoxy resin to produce chip solid electrolytic capacitors. Subsequently, the capacitors were aged at 135° C. with 3 V for 6 hours and then left standing in a furnace at 185° C. for 15 minutes to cure the jacket resin, to thereby produce final chip solid electrolytic capacitors.

Comparative Example 2

Chip solid electrolytic capacitors were produced in the same manner as in Example 1 except that the chemical formation was performed by using dopant-free aqueous 1 mass % phosphoric acid solution instead of the electrolytic solution used in Example 7 and that re-chemical formation was performed in dopant-free aqueous 0.1% acetic acid solution.

The performances of the capacitors produced in Examples 1 to 12 and Comparative Examples 1 and 2 were measured by the following methods. The results thereof are shown together in Table 2. The data in Table 2 show each average value of 30 capacitors produced in each of the Examples.

Capacitance: The capacitance was measured at room temperature and 120 Hz by using an LCR measuring meter manufactured by Hewlett Packard, Ltd.

ESR: The equivalent series resistance of the capacitor was measured at 100 kHz.

Dielectric tangent: The value was measured at room temperature and 120 Hz by using an LCR measuring meter manufactured by Hewlett Packard, Ltd.

High Heat Load Test:

Every ten of the capacitors produced in each Example were mounted on one substrate by soldering (mounting condition: the capacitors were passed three times through a reflow furnace in which the peak temperature was 260° C. and the dwelling time in the temperature pattern of 230° C. or more was 30 seconds.). 2.5 V of voltage was applied through wiring to each of the capacitors mounted on the total three substrates for each of the Examples, the substrates were left standing in a constant temperature bath at 105° c. for 2,000 hours and then pulled out from the bath to room temperature.

TABLE 1

Table 1

| Example No. | electrolytic solution used in Example |
|---|---|
| 1 | aqueous 1% anthraquinone-2-sulfonic acid solution |
| 2 | aqueous 0.5% benzoquinonesulfonic acid solution |
| 3 | aqueous 1% naphthalenesulfonic acid solution |
| 4 | aqueous 0.5% ferric toluenesulfonate solution |
| 5 | aqueous 0.1% ammonium anthraquinone-2-sulfonate solution |
| 6 | 0.1% ammonium borodisalicylate |
| 7 | aqueous 1% anthraquinone-2-sulfonic acid solution |
| 8 | aqueous 0.5% benzoquinonesulfonic acid solution |
| 9 | aqueous 1% naphthalenesulfonic acid solution |
| 10 | aqueous 0.5% ferric toluenesulfonate solution |
| 11 | aqueous 0.1% ammonium anthraquinone-2-sulfonate solution |
| 12 | 0.1% ammonium borodisalicylate |

TABLE 2

| | | Product Capacitance (μF) | Product Dielectric Tangent (%) | Product ESR (mΩ) | Dielectric Tangent (%) After Test |
|---|---|---|---|---|---|
| Example | 1 | 677 | 2.4 | 12 | 25 |
| | 2 | 670 | 2.3 | 14 | 29 |
| | 3 | 669 | 2.4 | 14 | 30 |
| | 4 | 672 | 2.7 | 15 | 30 |
| | 5 | 641 | 2.0 | 13 | 27 |
| | 6 | 663 | 2.2 | 16 | 31 |
| | 7 | 885 | 3.1 | 8 | 21 |
| | 8 | 880 | 2.8 | 10 | 28 |
| | 9 | 902 | 2.7 | 9 | 28 |
| | 10 | 871 | 3.4 | 11 | 31 |
| | 11 | 845 | 2.5 | 12 | 25 |
| | 12 | 869 | 2.7 | 14 | 27 |
| Com. Example | 1 | 674 | 2.3 | 21 | 144 |
| | 2 | 882 | 2.8 | 18 | 159 |

As seen from comparison of Examples 1 to 12 with Comparative Examples 1 and 2, when the dielectric layer is formed by performing chemical formation in an electrolytic solution containing a dopant, the produced solid electrolytic capacitor has high-capacitance with good reliability.

Furthermore, as seen from comparisons of, such as Example 1 with Example 3, Example 2 with Example 4, Example 7 with Example 9 and Example 8 with Example 10, quinonesulfonic acid is particularly excellent in stability for a long period as contrasted with alkyl substituted benzene (or naphthalene)sulfonic acid.

The invention claimed is:

1. A method for producing a solid electrolytic capacitor element, comprising forming a dielectric layer on the surface of an electric conductor, forming a semiconductor layer containing electrically conducting polymer by electrolytic polymerization on the dielectric layer and forming an electrode layer thereon, wherein the dielectric layer is formed by chemical formation in an electrolytic solution containing a dopant, and wherein the dopant is an electron-donating compound which gives an electrically conducting polymer having an electric conductivity of $10^1$ to $10^3$ S·cm$^{-1}$ when doped to a polymer compound having a conjugated double bond at its main chain at the time of electrolytic polymerization.

2. The method for producing a solid electrolytic capacitor element as claimed in claim 1, wherein the dopant is the same as the dopant contained in the electrically conducting polymer constituting the semi-conductor layer.

3. The method for producing a solid electrolytic capacitor element as claimed in claim 1, wherein the dopant is at least one member selected from compounds having a sulfonic acid group.

4. The method for producing a solid electrolytic capacitor element as claimed in claim 1, wherein the dopant is at least one member selected from boron compounds in which a carboxylic acid is coordinated to a boron atom.

5. The method for producing a solid electrolytic capacitor element as claimed in claim 1, wherein chemical formation is further performed again in the electrolytic solution described above.

6. The method for producing a solid electrolytic capacitor element as claimed in claim 1, wherein the electric conductor is a metal or alloy mainly comprising at least one member selected from a group consisting of tantalum, niobium, titanium and aluminum; a niobium oxide; or a mixture of at least two of the members selected from these metals, alloy and niobium oxide.

7. The method for producing a solid electrolytic capacitor element as claimed in claim 1, wherein the semiconductor layer is at least one layer selected from semiconductors mainly comprising an electrically conducting polymer obtained by doping a dopant in a polymer containing a repeating unit represented by the following formula (1) or (2):

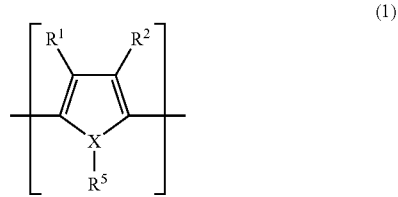

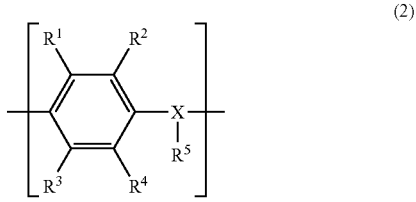

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

8. The method for producing a solid electrolytic capacitor element as claimed in claim 7, wherein the polymer containing a repeating unit represented by formula (1) is a polymer containing, as a repeating unit, a structural unit represented by the following formula (3):

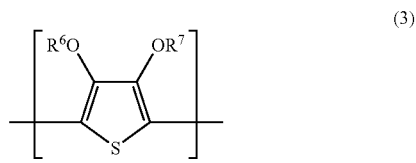

wherein $R^6$ and $R^7$ each independently represents a hydrogen atom, a linear or branched, saturated or unsaturated alkyl group having from 1 to 6 carbon atoms, or a substituent forming at least one or more 5, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

9. The method for producing a solid electrolytic capacitor element as claimed in claim 8, wherein the electrically conducting polymer is poly(3,4-ethylene-dioxythiophene).

10. The method for producing a solid electrolytic capacitor element as claimed in claim 7, wherein the electrically conducting polymer is selected from a group consisting of polyaniline, polyoxyphenylene, polyphenylene sulfide, polythiophene, polyfuran, polypyrrole, polymethylpyrrole, and a substitution derivative and a copolymer thereof.

11. The method for producing a solid electrolytic capacitor element as claimed in claim 7, wherein the electric conductivity of the semiconductor is from $10^{-2}$ to $10^3$ S·cm$^{-1}$.

12. A solid electrolytic capacitor element obtained by the production method described in claim 1.

13. A solid electrolytic capacitor obtained by sealing the solid electrolytic capacitor element described in claim 12.

14. An electronic circuit using the solid electrolytic capacitor described in claim 13.

15. An electronic device using the solid electrolytic capacitor described in claim 13.

16. A method for producing a solid electrolytic capacitor element, comprising forming a dielectric layer on the surface of an electric conductor, forming a semiconductor layer containing electrically conducting polymer by electrolytic polymerization on the dielectric layer and forming an electrode layer thereon, wherein the dielectric layer is formed by chemical formation in an electrolytic solution containing a dopant, and wherein the dopant is at least one member selected from quinone sulfonic acids which may be substituted.

* * * * *